US 012522273B2

(12) United States Patent
Stacey et al.

(10) Patent No.: US 12,522,273 B2
(45) Date of Patent: Jan. 13, 2026

(54) PARKING BRAKE ASSEMBLIES FOR CHILD STROLLERS

(71) Applicant: Britax Child Safety, Inc., Fort Mill, SC (US)

(72) Inventors: Angela Stacey, Fort Mill, SC (US); Huang Kai Yu, Fort Mill, SC (US)

(73) Assignee: Britax Child Safety, Inc., Fort Mill, SC (US)

( * ) Notice: Subject to any disclaimer, the term of this patent is extended or adjusted under 35 U.S.C. 154(b) by 442 days.

(21) Appl. No.: 18/300,174

(22) Filed: Apr. 13, 2023

(65) Prior Publication Data

US 2023/0331280 A1    Oct. 19, 2023

Related U.S. Application Data

(60) Provisional application No. 63/331,493, filed on Apr. 15, 2022, provisional application No. 63/331,476, filed on Apr. 15, 2022.

(51) Int. Cl.
 *F16D 63/00*  (2006.01)
 *B60T 1/06*  (2006.01)
 *B62B 9/08*  (2006.01)

(52) U.S. Cl.
 CPC .............. *B62B 9/087* (2013.01); *B60T 1/065* (2013.01); *B62B 9/085* (2013.01); *F16D 63/006* (2013.01)

(58) Field of Classification Search
 CPC ......... B62B 9/087; B62B 9/082; B62B 9/085; B60T 1/02; B60T 1/06; B60T 1/065; F16D 63/006

USPC .............. 188/19, 20, 31, 166, 167, 168, 169
 See application file for complete search history.

(56) References Cited

U.S. PATENT DOCUMENTS

| 482,708 | A | * | 9/1892 | Watkins | ..................... B62B 9/08 188/20 |
| 586,745 | A | * | 7/1897 | Pierce: | ................... D03D 49/08 188/74 |
| 1,361,756 | A | * | 12/1920 | Louis | ..................... B60R 25/09 70/226 |

(Continued)

FOREIGN PATENT DOCUMENTS

DE    102007044834 A1 *  4/2009    ............. B62B 9/085

OTHER PUBLICATIONS

Canadian Office Action for Canadian Patent Application No. 3,197,060 dated May 2, 2025.

*Primary Examiner* — Thomas J Williams
(74) *Attorney, Agent, or Firm* — K&L Gates LLP (57) ABSTRACT

A parking brake assembly includes a disc defining an aperture and a ramp located adjacent to the aperture; a pedal configured to rotate the disc in a locking direction or an unlocking direction; and an actuator including a body and a spring biased to push the body towards the aperture, the actuator further including a pin positioned and arranged to ride along the ramp when the disc is rotated relative to the actuator, wherein spring is allowed to push the body through the aperture and into a mating hole, of or associated with a wheel, when the disc is rotated in the locking direction such that the pin rides down the ramp, and wherein the spring is prevented from pushing the body through the aperture and into the mating hole when the disc is rotated in the unlocking direction such that the pin rides up the ramp.

18 Claims, 8 Drawing Sheets

(56) References Cited

U.S. PATENT DOCUMENTS

| | | | | |
|---|---|---|---|---|
| 2,450,662 A | * | 10/1948 | Hofmann | G01N 3/30 |
| | | | | 188/166 |
| 4,184,227 A | * | 1/1980 | Propst | B60B 33/021 |
| | | | | 16/35 R |
| 5,373,917 A | * | 12/1994 | Kamman | B62B 5/04 |
| | | | | 188/19 |
| 5,460,399 A | * | 10/1995 | Baechler | B62B 7/06 |
| | | | | 280/47.38 |
| 6,264,007 B1 | * | 7/2001 | Norton | A61G 5/1027 |
| | | | | 188/31 |
| 6,510,927 B1 | * | 1/2003 | Wu | B60T 1/005 |
| | | | | 280/DIG. 6 |
| 6,817,451 B1 | * | 11/2004 | Chen | B62B 9/085 |
| | | | | 188/29 |
| 7,059,452 B2 | | 6/2006 | Chen | |
| 7,537,093 B2 | | 5/2009 | Chen | |
| 7,757,819 B2 | | 7/2010 | Chen | |
| 7,815,019 B2 | | 10/2010 | Chen | |
| 8,201,667 B2 | | 6/2012 | Chen | |
| 8,316,999 B2 | | 11/2012 | Solinski | |
| 8,424,158 B2 | | 4/2013 | Steenson | |
| 8,490,757 B2 | | 7/2013 | Chen | |
| 8,540,059 B2 | | 9/2013 | Li | |
| 9,067,613 B2 | | 6/2015 | Yi | |
| 9,254,858 B2 | * | 2/2016 | Shellenberger | B62B 9/085 |
| 10,259,483 B2 | | 4/2019 | Plested | |
| 11,173,747 B2 | | 11/2021 | Renno | |
| 2014/0070505 A1 | | 3/2014 | Yi et al. | |
| 2018/0229751 A1 | * | 8/2018 | Yabuuchi | B62B 5/0438 |
| 2023/0331280 A1 | | 10/2023 | Stacey | |
| 2024/0083484 A1 | | 3/2024 | Yuan | |
| 2024/0126318 A1 | | 4/2024 | Yuan | |

* cited by examiner

PARKING BRAKE ASSEMBLIES FOR CHILD STROLLERS

PRIORITY CLAIM AND CROSS-REFERENCE TO RELATED APPLICATIONS

The present application claims priority and benefit of U.S. Provisional Patent App. No. 63/331,493 filed Apr. 15, 2022, titled PARKING BRAKE ASSEMBLIES FOR CHILD STROLLERS, and U.S. Provisional Patent App. No. 63/331, 476 filed Apr. 15, 2022, titled BRAKING ASSEMBLIES FOR CHILD STROLLERS, entire contents of which are incorporated by reference herein and relied upon.

BACKGROUND

The present disclosure relates generally to child/infant strollers.

A child stroller is generally an important item for most families. Many parents spend a good deal of time researching strollers before purchase or adding one to their baby registry. Strollers may also tend to be one of the more expensive items that a parent needs to purchase. But strollers make traveling outside the home with a child much easier. Strollers may be used for years, and may be used for multiple children, so obtaining a well-constructed stroller is generally worth the cost.

There are several different types of strollers from which a parent may choose. The simplest stroller is a stroller frame. The stroller frame is a skeleton of a stroller, including a handle, storage basket and wheels. A stroller is completed when the parent attaches an infant car seat to the stroller frame.

Lightweight strollers as the name implies weigh considerably less than traditional strollers. Lightweight strollers are sometimes referred to as travel strollers or compact strollers. Lightweight strollers are well suited for more treacherous travel, such as going up and down multiple flights of stairs, riding public transportation, etc.

All-purpose strollers may be considered a typical stroller, and are well-suited for travelling around the neighborhood or taking the child through a store.

Jogging strollers are built to handle rougher terrain and have a suspension structure configured to cushion and provide a smooth ride for the child even during heightened impacts due to the rougher terrain and the increased speed of the strollers.

Double strollers hold two children at once. If the parent has twins or children close in age, double strollers allow both children to be transported at once. Double strollers are generally provided in two configurations (i) front-to-back (children are inline) or (ii) side-by-side.

A convertible stroller converts from a single stroller to a double stroller. Convertible strollers are a good choice if parents are planning on having two children close in age. Like double strollers, convertible strollers may be provided front-to-back or side-by-side configurations.

A travel system includes a stroller that is also provided with an infant car seat that attaches to the stroller. Travel systems are advantages because the stroller can be used as soon while the infant is still very small, and because the infant does not have to be disturbed in a car seat to stroller transfer or vice versa.

Especially in the case of heavier strollers, and with jogging strollers, external braking becomes important. The increased weight and speed of the strollers increases the momentum that they achieve during travel. A smaller parent or perhaps older child walking a heavier stroller or running with a jogging stroller may have trouble stopping the stroller quickly if needed. Also, even a full sized adult who abruptly stops a stroller carrying a lot of momentum may jerk and disturb and/or wake the child. An external brake helps smaller walkers stop the stroller and for braking to be applied in a more even manner Existing stroller brakes in many instances are ineffective and complicated. A need exists accordingly for a child stroller having improved braking.

SUMMARY

The present disclosure sets forth an improved child/infant stroller. The improved child stroller may have one or both of two different brake assemblies, namely, a wheel brake assembly that provides braking to each rear wheel of the stroller and a parking brake assembly that locks one of the rear wheels when actuated. Any rigid or flexible part of any part of the stroller, including the wheel and parking brakes, may be made (e.g., molded) of any one or more plastic such as, but not limited to polyvinylchloride ("PVC"), polyethylene ("PE"), polyurethane ("PU"), polycarbonate ("PC") and/or polyetheretherketone ("PEEK"). Any rigid part of any part of the stroller, including the wheel and parking brakes, may be made (e.g., machined, formed or cast) alternatively or additionally of any one or more metal, e.g., stainless steel, steel and/or aluminum. It should be noted that, in a variety of embodiments, any combination of materials can be used in the construction of the child stroller of the present disclosure.

The child stroller described herein is generally illustrated as a jogging stroller having two rear wheels and a single front wheel. It should be appreciated however that the wheel brake assembly and the parking brake assembly described herein may be employed on any type of child stroller, including strollers having two front and two rear wheels.

The wheel brake assembly includes a brake lever that the user grasps and compresses against a handle of the child stroller. A cable, such as a metal braided cable, is attached to the brake lever and is thus pulled when the user actuates the brake lever. The cable extends through a flexible plastic tube for protection and to guide the cable along a desired route. The cable in one embodiment extends along the frame of the child stroller into a junction box located beneath the stroller adjacent to one of the rear wheels. Inside the junction box the cable extends to and attaches to a connector. In various embodiments, the cable is crimped into and/or welded to the connector.

Separate cables, one for each rear wheel, extend from the opposing end of connector into which the lever actuated cable enters. The rear wheel cable may also be metal braided cables and may likewise be crimped into and/or welded to the connector. A first rear wheel cable extends to and is attached to a first rear wheel mount, e.g., via crimping and/or soldering. A second rear wheel cable extends to a second rear wheel mount and may be attached in the same manner to the second rear wheel mount. It should be appreciated that the user actuation of the brake lever pulls both rear wheel cables (via the single lever actuated cable and the connector) and thus applies a braking action to both of the rear wheels.

The braking structure at the rear wheel mounts that is actuated by the rear wheel cables is not the same for both rear wheels in one embodiment. Namely, the structure for the disengagement of braking action and the retuning of the brake lever to its unactuated state need only be provided in one of the first and second rear wheel mounts. The structure for the disengagement of braking action is provided in one rear wheel mount and includes a torsion spring in one embodiment, which is positioned so that one end pushes against an inner wall of the rear wheel mount. The other end of the torsion spring pushes against a "V" or "L" shaped bracket, which is hinged at the intersection of the two legs of bracket via a hinge pin affixed to the rear wheel mount. The respective rear wheel cable terminates at and connects to the end of one of the legs of the "V" or "L" shaped bracket.

The torsion spring is biased against the "V" or "L" shaped bracket, such that when the user releases the brake lever, the bracket is rotated about the hinge pin. The rotation of the bracket about the hinge pin due to the biasing of the torsion spring pulls the respective rear wheel cable, the connector 58 (and thus the other rear wheel cable) and the lever actuated cable in the opposite direction that those structures are pulled when the user actuates the brake lever. In this manner, the rotation of the bracket about the hinge pin due to the biasing of the torsion spring returns the brake lever to its unactuated position, where it is maintained until the user overcomes the spring tension applied by the torsion spring.

Each of the first and second rear wheel mounts includes or is attached to a stationary brake band mount. The stationary brake band mount includes a pin or other fastener that holds or fixes one end of a brake band of wheel brake assembly. The brake band may be made of any of the materials discussed herein, and in one embodiment is made of a spring steel. A braking material strip, such as a rubber, fiberglass or composite material strip, is attached to, e.g., adhered, to the inside of the brake band, e.g., continuously along the inside of the brake band, leaving open ends of the brake band for connection. The brake band at its free end (opposing the end fixed by the pin or fastener) attaches to the end of the opposing leg of "V" or "L" shaped bracket from the leg to which the respective rear wheel cable is attached.

Each rear wheel includes or is coupled to a rotating drum, which rotates with the respective rear wheel. The rotating drum in one embodiment includes a cylindrical border having a width that is at least as wide as the width of the braking material strip. When the user grasps and compresses the brake lever against handle of the child stroller, the brake lever pulls the single cable, the connector and the first and second rear wheel cables. The pulling of the rear wheel cable associated with the torsion spring and the bracket rotates the "V" or "L" shaped bracket about the hinge pin in such a manner that the diameters of the brake band and the braking material strip, with the fixed end of the brake band held fixed at the pin or other fastener, so that the braking material strip frictionally contacts a large portion of the cylindrical border of the rotating drum, causing the drum and the corresponding rear wheel stop rotating. When the user releases the brake lever, the biasing of the torsion spring opens the brake band and the braking material strip away from the cylindrical border of the drum, allowing the corresponding rear wheel to be rotated once again.

The braking components of the wheel brake assembly for other of the first and second rear wheels include all of the structure and functionality just described except for the torsion spring, the "V" or "L" shaped bracket and the hinge pin. Instead, the torsion spring and the "V" or "L" shaped bracket are essentially bypassed for the other of the first and second wheels, so that the end of the other rear wheel cable extends to and is attached to the free end of the corresponding brake band. The pulling of the other rear wheel cable pulls on the free end of the corresponding brake band in such a manner that the diameters of the brake band and the braking material strip decrease, with the fixed end of the brake band held fixed at the pin or other fastener, so that the braking material strip frictionally contacts a large portion of the cylindrical border of the rotating drum, causing the drum and the corresponding rear wheel to stop rotating. When the user releases brake lever, the biasing of the torsion spring (at the first rear wheel) pushes the other rear wheel cable towards the corresponding brake band, and causes the brake band and the braking material strip to open away from the cylindrical border of the drum, allowing the other rear wheel to be rotated once again. The structure and functionality of the wheel brake assembly of the present disclosure apply the braking forces described herein to both of the rear wheels simultaneously via a single action of the user squeezing the brake lever.

The parking brake assembly of the present disclosure may be provided in addition to or alternatively to the wheel brake assembly. The parking brake assembly includes a parking brake pedal provided at one of the rear wheel mounts. In the examples shown herein, the parking brake pedal is configured such that the user's foot rotates the pedal downwardly to apply the parking brake assembly and such that the user's toe rotates the parking brake pedal upwardly to unlock the parking brake assembly. Like with the wheel brake assembly, a single user actuation of the parking brake pedal advantageously applies the parking brake to or removes the parking brake from both the rear wheels.

The parking brake pedal includes a member that extends into a mating receptacle of a parking brake disc. The parking brake disc is located within a parking brake collar and is rotated about a central axis of the rear wheel via the user actuation of the parking brake pedal.

The parking brake disc is formed with or attached to a ramp in one embodiment. The ramp ramps up from a base surface of the parking brake disc to an apex. The ramp adjacent to the apex also includes an indented holding portion, which holds the parking brake assembly in an unlocked position until the parking brake pedal is actuated. The parking brake disc may be also formed with or attached to a clip, such as a spring clip. When the parking brake assembly is in a parking brake applied or locked configuration, the parking brake pedal has been rotated fully downwardly. Here, an engagement edge of the clip snap-fits over a stop of the parking brake collar. The snap-fitting of the engagement edge of the spring clip over the stop of the parking brake collar helps to maintain the parking brake pedal in the fully rotated down (locked) position. The user overcomes the spring clip force to unlock parking brake assembly.

The parking brake assembly further includes a spring-loaded actuator in one embodiment. The spring-loaded actuator incudes a body mounted to extend generally perpendicular to the parking brake disc. A compression spring is located between the actuator body and a wall of the corresponding rear wheel mount. The compression spring is biased to push the actuator body towards a slot or aperture formed in the parking brake disc. The spring-loaded actuator also includes a pin that extends generally perpendicular to the actuator body. The compression spring is also biased to push the pin against the ramp and over the apex into the indented holding portion depending on the rotational position of the parking brake disc.

When the parking brake pedal is in the fully rotated down or locked position, the rear wheels are not free to rotate. Here, the engagement edge of the clip of the disc abuts against the stop of the parking brake collar. Additionally, the pin is located at the lowest or entrance part of the ramp (located adjacent to the slot or aperture), which allows the compression spring to decompress or expand so that the actuator body of the spring-loaded actuator is able to extend through the slot or aperture formed in the parking brake disc. When the user rotates the parking brake pedal upwardly, the pin is forced to translate up along the ramp, forcing the actuator body out of the slot, and compressing the compression spring. When the parking brake pedal reaches its fully rotated upward position, the pin is translated up over the apex and into the indented holding portion. Here, the parking brake assembly is in an unlocked condition, wherein the rear wheels are free to rotate. When in the unlocked position, the apex tends to hold the pin and thus the spring-loaded actuator so as not to accidentally actuate the parking brake.

The rotating drum associated with the wheel includes or defines a series of holes or apertures. The holes or apertures are formed very close together such that the walls separating holes or apertures may be rounded or pointed, so that the contacting tip of the actuator body is readily guided into the next hole or aperture that rotates into registry with the actuator body while under compression from the spring. When the user rotates the parking brake pedal downwardly to apply the parking brake assembly, the compression spring is able to push the actuator body into the next available hole or aperture. Afterwards, the wheel is not free to rotate. The wheel remains in the locked state until the user rotates the parking brake pedal upwardly to unlock the parking brake assembly, wherein the pin and the actuator body are forced up the ramp, removing the actuator body from the engaged hole or aperture.

A cable of the parking brake assembly extends from one rear wheel mount to another rear wheel mount. The cable may be located within a flexible plastic sheath or tube for protection and guidance. The cable is attached to parking brake disc and is accordingly moved (translated) as the parking brake disc is rotated via the foot pedal. As the parking brake pedal is rotated downwardly to lock the parking brake assembly, the cable is pulled away from a parking brake disc associated with the opposing rear wheel mount. As the parking brake pedal is rotated upwardly to unlock the parking brake assembly, the cable is pushed towards the parking brake disc associated with opposing rear wheel mount.

The parking brake disc for the opposing rear wheel also includes a ramp extending up from base surface and a slot or aperture formed in the base surface. The parking brake assembly at the opposing rear wheel mount also provides a spring-loaded actuator having a body mounted to extend generally perpendicular to the parking brake disc. A compression spring is located between the actuator body and a wall of the opposing rear wheel mount. The compression spring is biased to push the actuator body towards the slot or aperture formed in the parking brake disc. The spring-loaded actuator also includes a pin that extends generally perpendicular to the actuator body. Accordingly, the compression spring is also biased to push the pin against the ramp.

The downward rotation of the parking brake pedal (to lock the adjacent wheel) pulls the cable away from the parking brake disc for the opposing rear wheel. The pulling force causes a rotation of the parking brake disc, such that the pin slides down the ramp, allowing the compression spring to push the body of the actuator through the slot and into a hole or aperture of the rotating drum of or associated with the opposing wheel. Thus, a single action of the parking brake pedal by the user applies the parking brake assembly to both rear wheels.

The upward rotation of the parking brake pedal (to unlock the adjacent wheel) pushes the cable towards the parking brake disc for the opposing rear wheel. The pushing force causes a rotation of the parking brake disc, such that the pin slides up the ramp, compressing the compression spring and pulling the body of the actuator from the slot and from the hole or aperture of the rotating drum of or associated with the opposing wheel. Likewise, a single action of the parking brake pedal by the user unlocks the parking brake assembly from both rear wheels.

In light of the disclosure set forth herein, and without limiting the disclosure in any way, in a first aspect of the present disclosure, which may be combined with any other aspect, or portion thereof, a wheel brake assembly includes a brake lever positioned and arranged to be grasped and actuated by a user; a lever actuated cable extending from the brake lever; a connector, the lever actuated cable extending to the connector; first and second rear wheel cables extending from the connector; a bracket, the first rear wheel cable extending to the bracket; a brake band in mechanical communication with the bracket; and a spring biasing the bracket such that the brake lever is maintained in an unactuated position and such that a wheel is free to rotate within the brake band.

In a second aspect of the present disclosure, which may be combined with any other aspect, or portion thereof, the first and second rear wheel cables extending from a first side of the connector, the first side opposing a second side of the connector to which the lever actuated cable extends.

In a third aspect of the present disclosure, which may be combined with any other aspect, or portion thereof, the bracket includes a first leg and a second leg, wherein the first rear wheel cable extends to the first leg of the bracket, and wherein the brake band is in mechanical communication with the second leg of the bracket.

In a fourth aspect of the present disclosure, which may be combined with any other aspect, or portion thereof, the bracket is pivotally connected to a fixture at an intersection of the first and second legs of the bracket.

In a fifth aspect of the present disclosure, which may be combined with any other aspect, or portion thereof, the spring biases the first leg of the bracket.

In a sixth aspect of the present disclosure, which may be combined with any other aspect, or portion thereof, the brake band includes a fixed end and a free end, the free end in mechanical communication with the bracket, and wherein actuation of the brake lever overcomes the biasing of the bracket by the spring such that the bracket moves the free end of the brake band to reduce a diameter of the brake band and to apply a braking force to the wheel.

In a seventh aspect of the present disclosure, which may be combined with any other aspect, or portion thereof, the fixed end of the brake band is a pivotally fixed end.

In an eighth aspect of the present disclosure, which may be combined with any other aspect, or portion thereof, the wheel brake assembly includes a braking material strip applied to an inner surface of the brake band, the braking material strip applying the braking force to the wheel.

In a ninth aspect of the present disclosure, which may be combined with any other aspect, or portion thereof, the brake band is sized to be reduced in diameter about a drum of or associated with the wheel.

In a tenth aspect of the present disclosure, which may be combined with any other aspect, or portion thereof, the wheel is a first wheel and the brake band is a first brake band, which includes a second wheel and a second brake band, wherein the second rear wheel cable extends to the second brake band, and wherein the spring is further biased such that the second wheel is free to rotate within the second brake band.

In an eleventh aspect of the present disclosure, which may be combined with any other aspect, or portion thereof, the second brake band includes a fixed end and a free end, the free end in mechanical communication with the second rear wheel cable, and wherein actuation of the brake lever overcomes the biasing of the second brake band, such that the second rear wheel cable moves the free end of the second brake band to reduce a diameter of the second brake band and to apply a braking force to the second wheel.

In a twelfth aspect of the present disclosure, which may be combined with any other aspect, or portion thereof, the fixed end of the second brake band is a pivotally fixed end.

In a thirteenth aspect of the present disclosure, which may be combined with any other aspect, or portion thereof, the wheel brake assembly includes a braking material strip applied to an inner surface of the second brake band, the braking material strip applying the braking force to the second wheel.

In a fourteenth aspect of the present disclosure, which may be combined with any other aspect, or portion thereof, the second brake band is sized to be reduced in diameter about a drum of or associated with the second wheel.

In a fifteenth aspect of the present disclosure, which may be combined with any other aspect, or portion thereof, a child stroller includes a wheel including or associated with a drum that rotates with the wheel; and a wheel brake assembly including a brake lever positioned and arranged to be grasped and actuated by a user; a lever actuated cable extending from the brake lever; a connector, the lever actuated cable extending to the connector; first and second rear wheel cables extending from the connector; a bracket, the first rear wheel cable extending to the bracket; a brake band in mechanical communication with the bracket; and a spring biasing the bracket such that the brake lever is maintained in an unactuated position and such that the drum is free to rotate within the brake band.

In a sixteenth aspect of the present disclosure, which may be combined with any other aspect, or portion thereof, the wheel is a rear wheel of the child stroller.

In a seventeenth aspect of the present disclosure, which may be combined with any other aspect, or portion thereof, the child stroller includes a handle, the brake lever provided at the handle, the child stroller further including a frame supporting the handle, and wherein the lever actuated cable extends along a portion of the frame to the connector.

In an eighteenth aspect of the present disclosure, which may be combined with any other aspect, or portion thereof, the wheel is a first wheel and the brake band is a first brake band, which includes a second wheel and a second brake band, wherein the second rear wheel cable extends to the second brake band, and wherein the spring is further biased such that the second wheel is free to rotate within the second brake band.

In a nineteenth aspect of the present disclosure, which may be combined with any other aspect, or portion thereof, the connector is provided adjacent to the first wheel, and wherein the second rear wheel cable extends from the connector to the second band brake associated with the second wheel.

In a twentieth aspect of the present disclosure, which may be combined with any other aspect, or portion thereof, the child stroller is a jogging stroller.

In a twenty-first aspect of the present disclosure, which may be combined with any other aspect, or portion thereof, a parking brake assembly includes a parking brake disc defining an aperture and a ramp located adjacent to the aperture; a pedal configured such that when the user actuates the pedal, the parking brake disc is rotated in a locking direction or an unlocking direction; and an actuator including a body and a spring biased to push the body towards the aperture, the actuator further including a pin positioned and arranged to ride along the ramp when the parking brake disc is rotated relative to the actuator, wherein the spring is allowed to push the body through the aperture and into a mating hole, of or associated with a wheel, when the parking brake disc is rotated in the locking direction such that the pin rides down the ramp, and wherein the spring is prevented from pushing the body through the aperture and into the mating hole when the parking brake disc is rotated in the unlocking direction such that the pin rides up the ramp.

In a twenty-second aspect of the present disclosure, which may be combined with any other aspect, or portion thereof, the pedal is separate from and connected to the parking brake disc.

In a twenty-third aspect of the present disclosure, which may be combined with any other aspect, or portion thereof, the aperture defined by the parking brake disc is a slotted aperture.

In a twenty-fourth aspect of the present disclosure, which may be combined with any other aspect, or portion thereof, the body of the actuator is at least substantially perpendicular to the aperture of the parking brake disc.

In a twenty-fifth aspect of the present disclosure, which may be combined with any other aspect, or portion thereof, the ramp includes a radius sized so that the ramp is located adjacent to the aperture.

In a twenty-sixth aspect of the present disclosure, which may be combined with any other aspect, or portion thereof, the ramp extends to an apex, and wherein an indented holding portion is provided adjacent to the apex for releasably holding the pin and the body of the actuator when the parking brake disc is rotated fully in the unlocking direction.

In a twenty-seventh aspect of the present disclosure, which may be combined with any other aspect, or portion thereof, the parking brake disc is held rotatably within a parking brake collar.

In a twenty-eighth aspect of the present disclosure, which may be combined with any other aspect, or portion thereof, the parking brake disc includes a spring clip configured to snap-fit over a stop of an adjacent parking brake collar when the parking brake disc is rotated fully in the locking direction.

In a twenty-ninth aspect of the present disclosure, which may be combined with any other aspect, or portion thereof, the parking brake disc is a first parking brake disc provided for the wheel, which includes a second parking brake disc provided for a second wheel, which includes a cable extending between the first and second parking brake discs, such that (i) rotating the first parking brake disc in the locking direction causes the cable to rotate the second parking brake disc in a locking direction, and (ii) rotating the first parking brake disc in the unlocking direction causes the cable to rotate the second parking brake disc in an unlocking direction.

In a thirtieth aspect of the present disclosure, which may be combined with any other aspect, or portion thereof, the second parking brake disc defines a second aperture and a second ramp located adjacent to the second aperture, which includes a second actuator including a second body and a second spring biased to push the second body towards the second aperture, the second actuator further including a second pin positioned and arranged to ride along the second ramp when the second parking brake disc is rotated relative to the second actuator, wherein the second spring is allowed to push the second body through the second aperture and into a second mating hole, of or associated with the second wheel, when the second parking brake disc is rotated in the locking direction such that the second pin rides down the second ramp, and wherein the second spring is prevented from pushing the second body through the second aperture and into the second mating hole when the second parking brake disc is rotated in the unlocking direction such that the second pin rides up the second ramp.

In a thirty-first aspect of the present disclosure, which may be combined with any other aspect, or portion thereof, a child stroller includes a wheel including or associated with a drum that rotates with the wheel; and a parking brake assembly including a parking brake disc defining an aperture and a ramp located adjacent to the aperture; a pedal configured such that when the user actuates the pedal, the parking brake disc is rotated in a locking direction or an unlocking direction; and an actuator including a body and a spring biased to push the body towards the aperture, the actuator further including a pin positioned and arranged to ride along the ramp when the parking brake disc is rotated relative to the actuator, wherein the spring is allowed to push the body through the aperture and into a mating hole formed in the drum when the parking brake disc is rotated in the locking direction such that the pin rides down the ramp, and wherein the spring is prevented from pushing the body through the aperture and into the mating hole formed in the drum when the parking brake disc is rotated in the unlocking direction such that the pin rides up the ramp.

In a thirty-second aspect of the present disclosure, which may be combined with any other aspect, or portion thereof, the drum forms a plurality of holes in a circular pattern.

In a thirty-third aspect of the present disclosure, which may be combined with any other aspect, or portion thereof, the plurality of holes are separated by thin walls of the drum.

In a thirty-fourth aspect of the present disclosure, which may be combined with any other aspect, or portion thereof, any of the features, functionality and alternatives described in connection with any one or more of FIGS. 1 to 8 may be combined with any of the features, functionality and alternatives described in connection with any other of FIGS. 1 to 8.

In light of the above aspects and the disclosure set forth herein, it is accordingly an advantage of the present disclosure to provide an improved child/infant stroller.

It is another advantage of the present disclosure to provide improved braking for a child stroller.

It is a further advantage of the present disclosure to provide a braking force to multiple wheels of a child stroller via a single brake lever actuation.

Further still, it is an advantage of the present disclosure to provide at least one band brake for a child stroller.

Moreover, it is an advantage of the present to provide an improved parking brake for a child stroller.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Referring now to the drawings and in particular to FIGS. 1 to 4, a first primary embodiment for an improved child/infant stroller is illustrated by stroller 10. Any rigid or flexible part of child stroller 10, including the wheel and parking brakes of the present disclosure, may be made (e.g., molded) of any one or more plastic, e.g., polyvinylchloride ("PVC"), polyethylene ("PE"), polyurethane ("PU"), polycarbonate ("PC") and/or polyetheretherketone ("PEEK"). Any rigid part of child stroller 10, including the wheel and parking brakes discussed herein, may be made (e.g., machined, formed or cast) alternatively or additionally of any one or more metal, e.g., stainless steel, steel and/or aluminum. In a variety of embodiments, any combination of materials could be used in the construction of the child stroller of the present disclosure.

Figure 1:
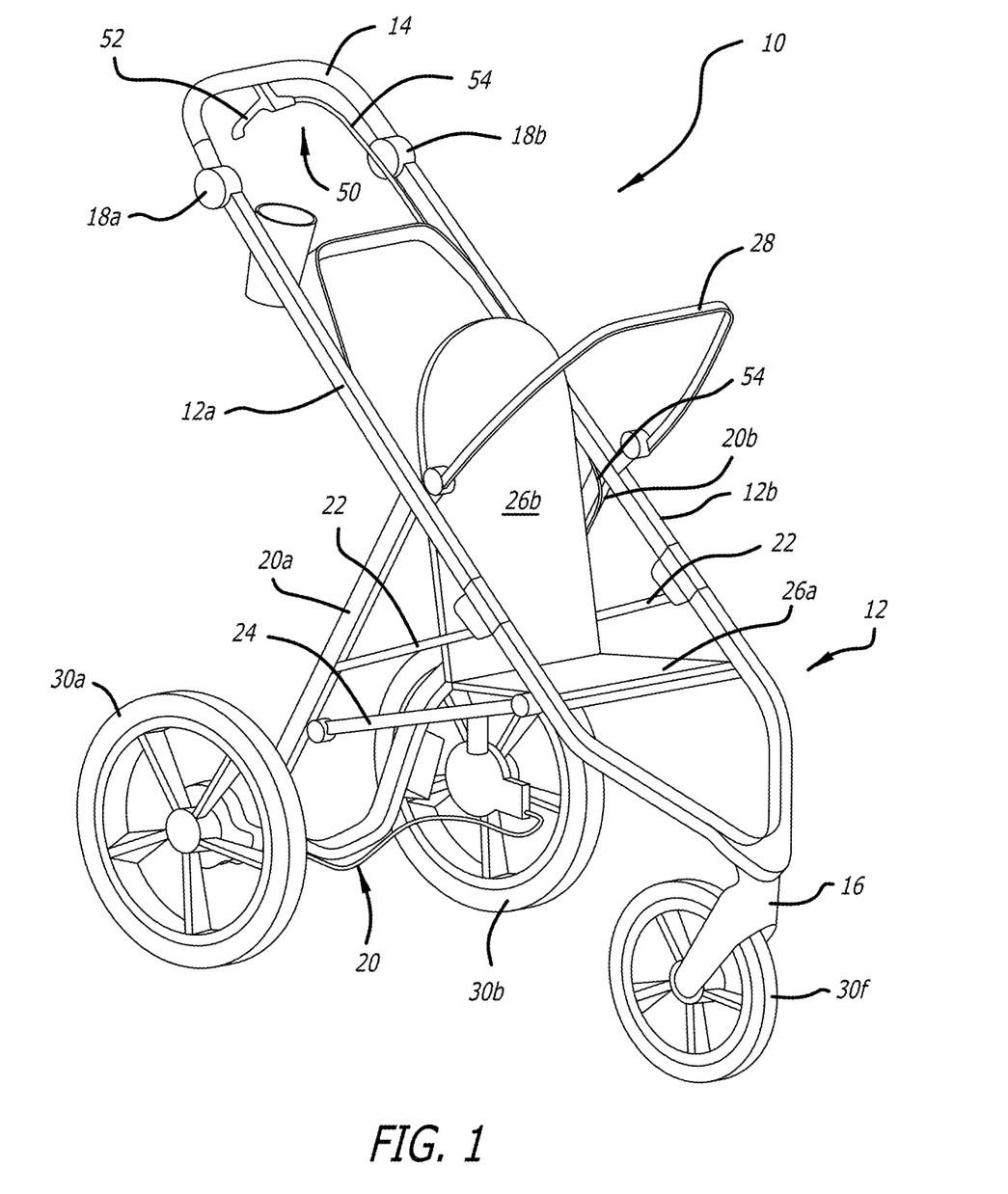
FIG. 1 is a perspective view of one embodiment of the child stroller of the present disclosure.

In the illustrated embodiment of FIG. 1, child stroller 10 includes a primary frame 12 that extends to a handle 14 on one end and to a front wheel mount 16 on its opposing end. In the illustrated embodiment, primary frame 12 includes sides 12a, 12b that converge at front wheel mount 16 and that extend in the opposite direction to rotating couplers 18a, 18b, respectively. Rotating couplers 18a, 18b rotatably couple handle 14 to primary frame 12 so that handle 14 may be set at different angles relative to sides 12a, 12b depending on what angle feels most comfortable to the user.

Child stroller 10 includes a generally U-shaped rear wheel frame 20. Rear wheel frame 20 includes sides 20a, 20b that connect respectively to sides 12a, 12b of primary frame 12. The angle and positioning of sides 20a, 20b of rear wheel frame 20 relative to sides 12a, 12b of primary frame 12 when child stroller 10 is in a deployed or operating position is set by a pair of supporting struts 22 and 24 located one each side of child stroller 10. In the illustrated embodiment, struts 22 are inner supporting struts, while struts 24 are outer supporting struts.

FIG. 1 further illustrates that child stroller 10 includes a child seat 26a and seat back 26b, which support padding (not illustrated). Child stroller 10 may further include one or more canopy frame 28 that rotatably and collapsibly holds a sun and weather-blocking canopy (not illustrated). FIG. 1 further illustrates that a manually actuated brake lever 52 of a wheel brake assembly 50 described in detail herein. The user compresses brake lever 52 against handle 14 to apply the wheel brake of assembly 50. Still further, FIG. 1 illustrates that child stroller 10 in one embodiment includes a pair of rear wheels 30a, 30b and a front wheel 30f (e.g., for a jogging stroller).

Figure 2:
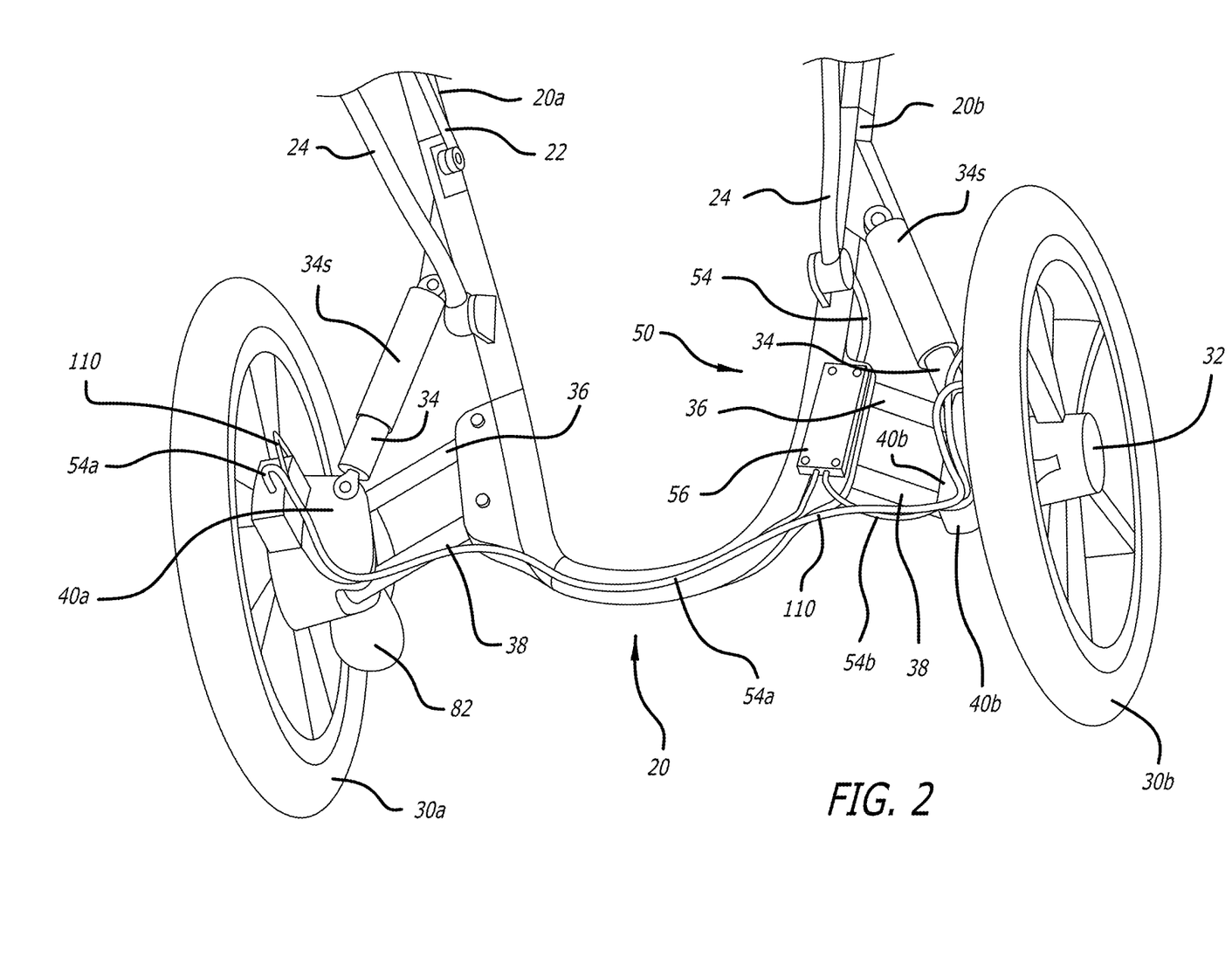
FIG. 2 is a perspective view from underneath the child stroller showing one embodiment for how the rear wheels are attached to the generally U-shaped rear wheel frame of the child stroller of the present disclosure.

Referring now to FIG. 2 the structural connection between generally U-shaped rear wheel frame 20 and rear wheels 30a, 30b is illustrated in more detail. FIG. 2 is a view from underneath the child stroller looking from front wheel 30f towards rear wheels 30a, 30b. For reference, a bottom portion of U-shaped rear wheel frame 20 and portions of inner supporting struts 22 and outer supporting struts 24 described in FIG. 1 are illustrated. FIG. 2 illustrates that rear wheels 30a, 30b are connected rotatably to rear wheel mounts 40a, 40b, respectively. Rear wheel mounts 40a, 40b in turn are connected to sides 20a, 20b of rear wheel frame 20, respectively, via supporting struts 34, 36, 38. In the illustrated embodiment, supporting struts 34 are upper supporting struts, supporting struts 36 are middle supporting struts, while supporting struts 38 are lower supporting struts.

Supporting struts 34 in the illustrated embodiment are provided with shock absorbers 34s, while middle and lower supporting struts 36, 38 are rotatably connected to both sides 20a, 20b of rear wheel frame 20 and to rear wheel mounts 40a, 40b. In this manner, and in the jogging implementation of stroller 10, upper supporting struts 34 via shock absorbers 34s are able to be compressed to absorb shock during use, while middle and lower supporting struts 36, 38 are able to rotate as needed to account for the shortening and unshortenting of upper supporting struts 34. When the stroller is collapsed, the upper connection point of shock absorbers 34s are translated upward with respect to the inner supporting struts 20a and 20b. As a result of this translation, the middle and lower supporting struts pivot and the two wheels 30a, 30b respectively collapse inwardly toward the U-shaped rear wheel frame 20. Advantageously, this collapsing minimizes the maximum deployed wheel-base profile of the stroller when not in use, making it easier to store and handle in the collapsed configuration.

Wheel Brake Assembly

Figure 3:
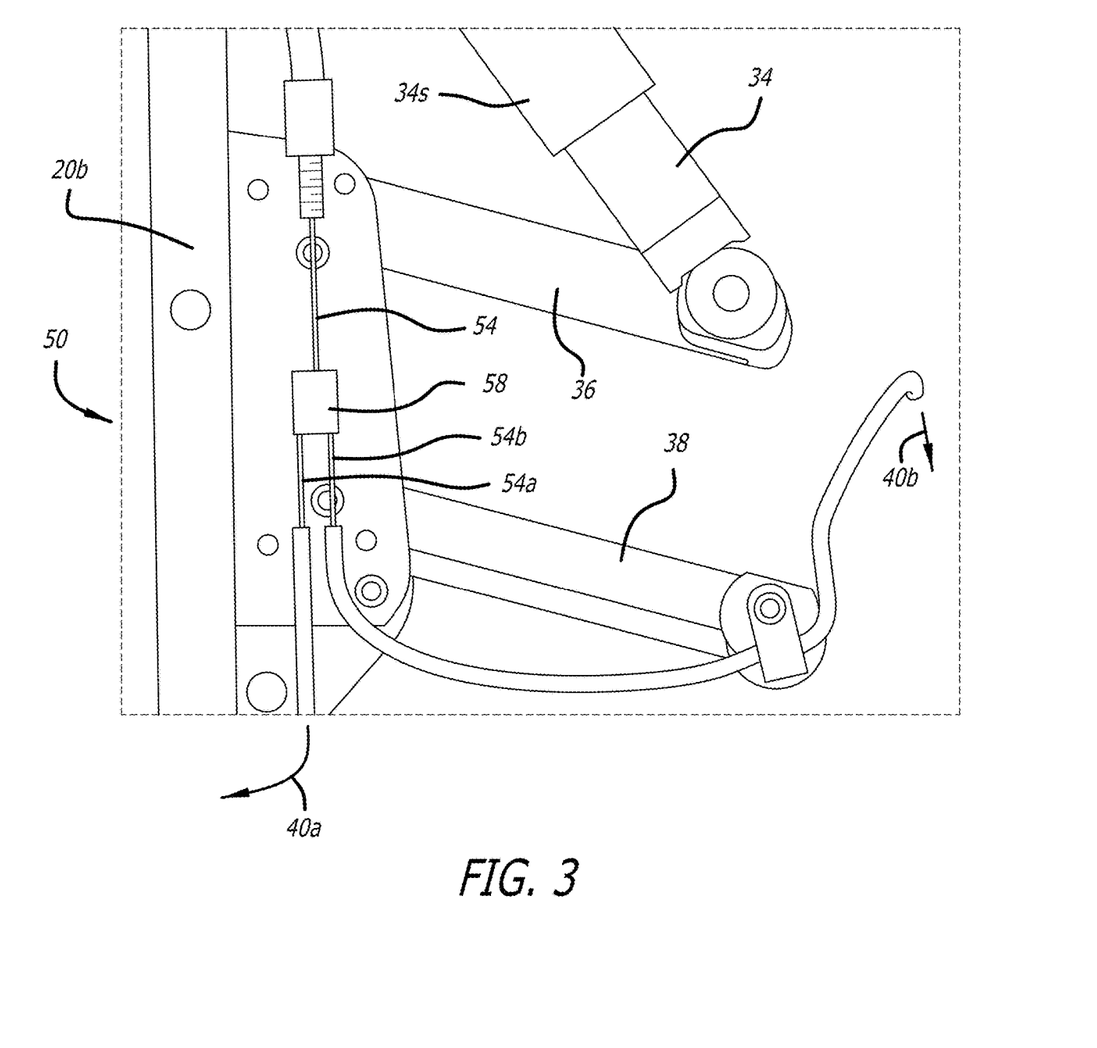
FIG. 3 is a sectioned elevation view illustrating one embodiment for a lever actuated transitioning to two rear wheel cables.

FIGS. 1 and 2 also illustrate portions of wheel brake assembly 50. FIG. 1 illustrates that when the user compresses brake lever 52 of assembly against handle 14, a cable 54 attached to brake lever 52 is pulled. Cable 54 extends through a flexible plastic tube for protection and to guide the cable along a desired route. In FIG. 1, cable is illustrated as extending from brake lever 52 to side 20b of rear wheel frame 20. FIG. 2 illustrates cable 54 extending down along frame side 20b into a junction box 56. FIG. 3 illustrates junction box 56 with its cover removed. For reference in FIG. 3, side 20b of rear wheel frame 20 and supporting struts 34, 36, 38 are illustrated. Cable 54 is shown extending to and attached to a connector 58. In various embodiments, cable 54 is crimped into and/or welded to connector 58.

Separate cables 54a and 54b extend from the opposing end of connector 58. Cables 54a and 54b may likewise be crimped into and/or welded to connector 58. FIGS. 2 and 3 illustrate that cable 54a extends to and is attached to rear wheel mount 40a, e.g., via crimping and/or soldering. FIG. 3 illustrates that cable 54b extends to rear wheel mount 40b. Cable 54b and is attached in the same manner to rear wheel mount 40b. It should be appreciated that the user actuation of brake lever 52 pulls both cables 54a and 54b (via single cable 54 and connector 58) and thus applies a braking action to both rear wheels 30a, 30b simultaneously.

Figure 4:
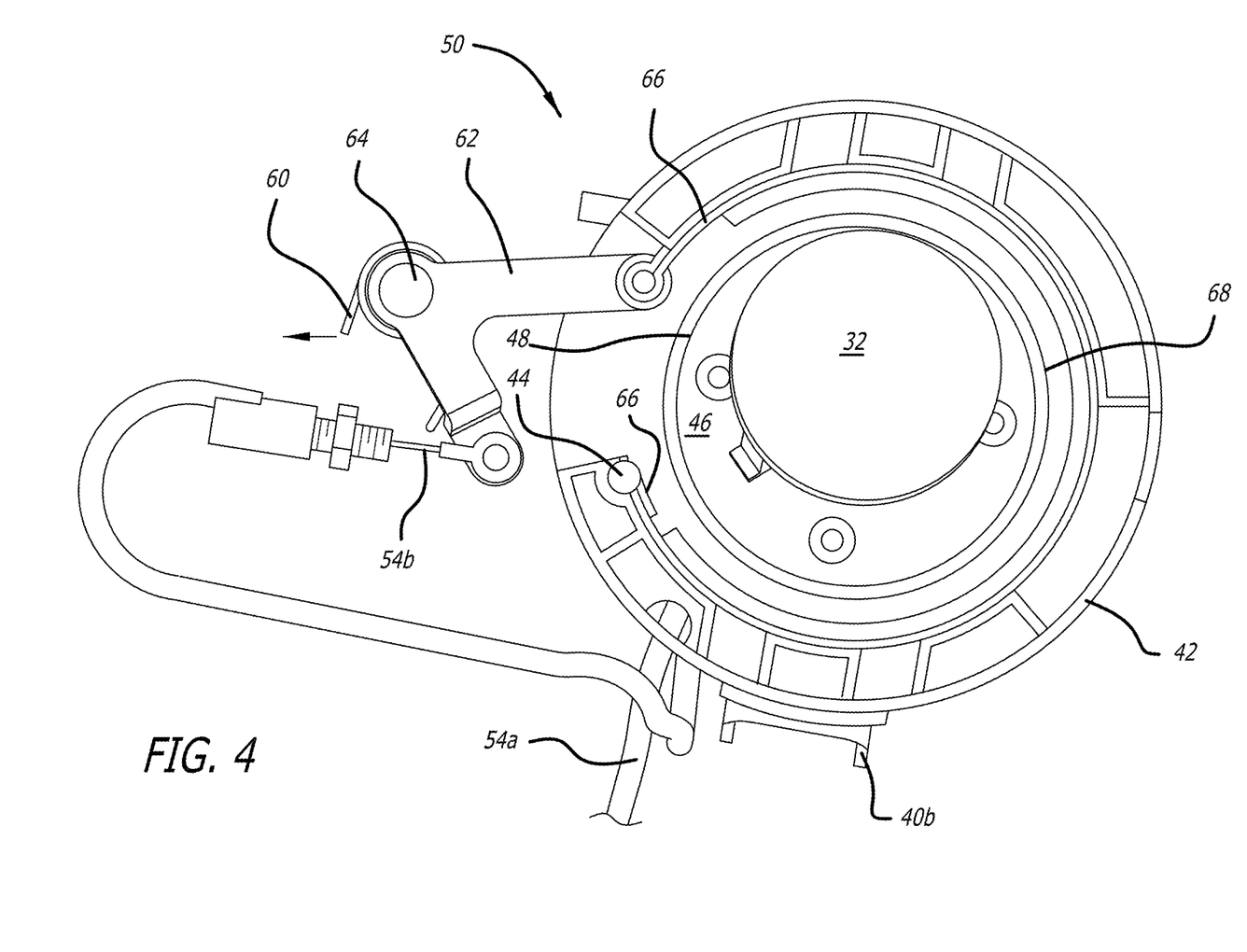
FIG. 4 is a sectioned perspective view illustrating one embodiment for the application of the wheel brake assembly of the present disclosure.
Figure 5:
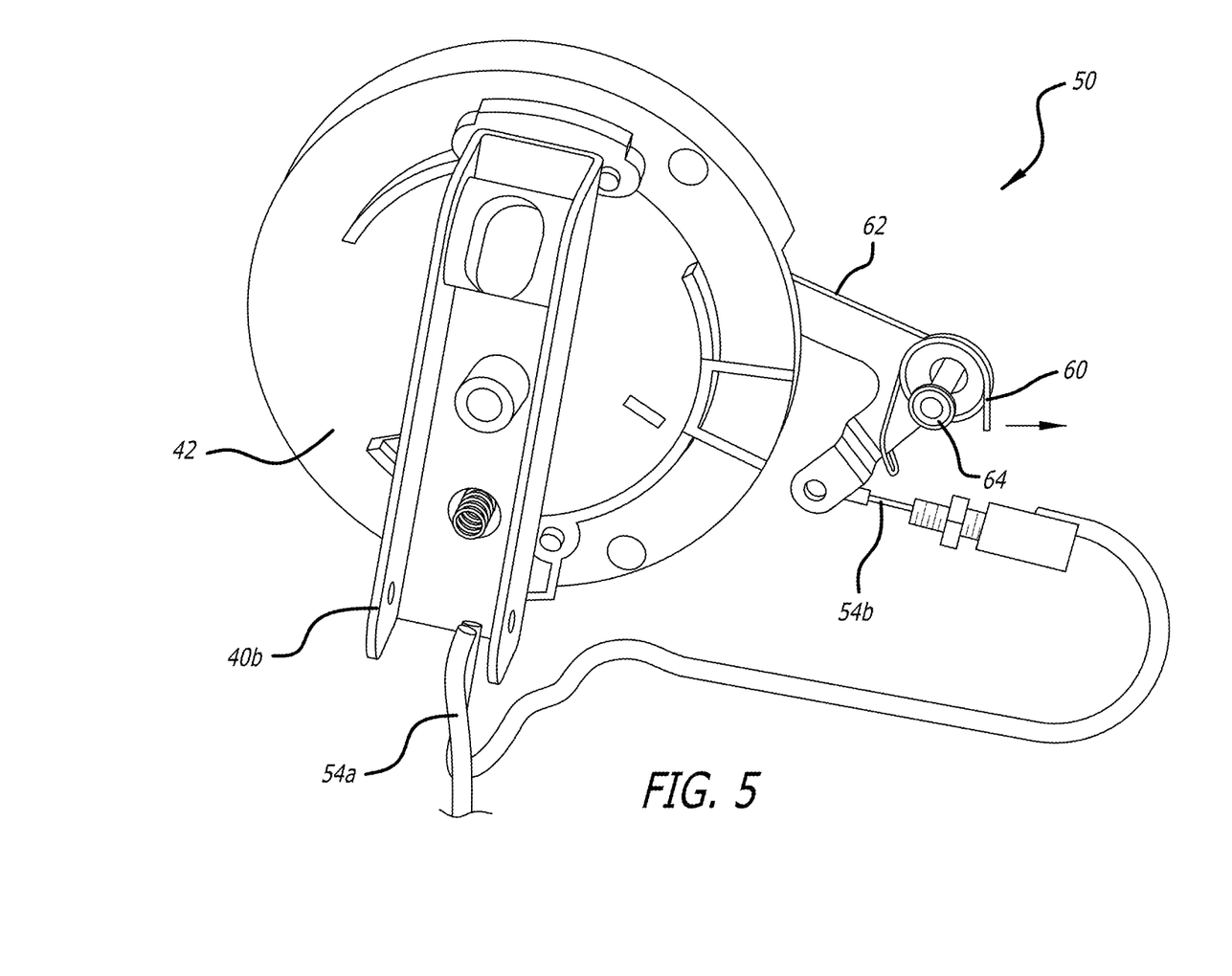
FIG. 5 is another sectioned perspective view illustrating one embodiment for the application of the wheel brake assembly of the present disclosure.

The structure at rear wheel mounts 40a, 40b actuated by cables 54a and 54b is not the same for both rear wheels 30a, 30b in one embodiment. Namely, the structure for the disengagement of braking action and retuning brake lever 52 to its unactuated state need only be provided in one rear wheel mount 40a, 40b. FIGS. 4 and 5 illustrate that the structure for the disengagement of braking action is provided in rear wheel mount 40b in one embodiment. In particular, a torsion spring 60 is positioned so that one end pushes against an inner wall of rear wheel mount 40b (which has been hidden for illustration purposes). The other end of torsion spring 60 pushes against a "V" or "L" shaped bracket 62, which is hinged at the intersection of the two legs of bracket 62 via a hinge pin 64 affixed to rear wheel mount 40b. Cable 54a terminates at and connects to the end of one of the legs of "V" or "L" shaped bracket 62.

Torsion spring 60 is biased against "V" or "L" shaped bracket 62, such that when the user releases brake lever 52, bracket 62 is rotated counterclockwise in FIG. 4 about hinge pin 64 and clockwise in FIG. 5 about hinge pin 64. The rotation of bracket 62 about hinge pin 64 due to torsion spring 60 pulls cable 54b, connector 58 (and thus cable 54a) and cable 54 in the opposite direction that those structures are pulled when the user actuates brake lever 52. In this manner, the rotation of bracket 62 about hinge pin 64 due to torsion spring 60 returns brake lever 52 to its unactuated position, where it is maintained until the user overcomes the spring tension applied by torsion spring 60.

FIG. 4 best illustrates how wheel brake assembly 50 applies its braking force. Rear wheel mount 40b includes or is attached to a stationary band mount 42. Band mount 42 includes a pin or other fastener 44 that holds or fixes one end of a brake band 66 of wheel brake assembly 50. Brake band 66 may be made of any of the materials discussed herein, and in one embodiment is made of a spring steel. A braking material strip 68, such as a rubber, fiberglass or composite material strip, is attached to, e.g., adhered, to the inside of brake band 66, e.g., continuously along the inside of the brake band, leaving open ends of the brake band for connection. Brake band 66 at its free end attaches to the end of the opposing leg of "V" or "L" shaped bracket 62 from the leg to which cable 54b is attached.

FIG. 4 further illustrates a cap 32 (FIG. 2) of rear wheel 30b to give some reference for the rear wheel, which has been largely removed to illustrate the braking components of wheel brake assembly 50. Rear wheel 30b may include or be coupled to a rotating drum 46, which rotates with rear wheel 30b. Rotating drum 46 includes a cylindrical border 48 having a width that is in one embodiment at least as wide as the width of braking material strip 68. When the user grasps and compresses brake lever 52 against handle 14, brake lever 52 pulls cable 54, connector 58 and cable 54b (from right to left in FIG. 4 and from left to right in FIG. 5). The pulling of cable 54b rotates "V" or "L" shaped bracket 62 about hinge pin 64 (clockwise in FIG. 4 and counterclockwise in FIG. 5) in such a manner that the diameters of brake band 66 and braking material strip 68 decrease, with fixed end of brake band 66 held fixed at pin or other fastener 44, so that braking material strip 68 frictionally contacts a large portion of cylindrical border 48 of rotating drum 46, causing the drum and corresponding rear wheel 30b to stop rotating. When the user releases brake lever 52, the biasing of torsion spring 60 opens brake band 66 and braking material strip 68 away from cylindrical border 48, allowing rear wheel 30b to be rotated once again.

The braking components of wheel brake assembly 50 for rear wheel 30a include all of the structure and functionality just described for rear wheel 30b except for torsion spring 60, "V" or "L" shaped bracket 62 and hinge pin 64. Instead, torsion spring 60 and "V" or "L" shaped bracket 62 are essentially bypassed, so that the end of cable 54a extends to and is attached to the free end of brake band 66. The pulling of cable 54a pulls on the free end of brake band 66 in such a manner that the diameters of brake band 66 and braking material strip 68 decrease, with fixed end of brake band 66 held fixed at pin or other fastener 44, so that braking material strip 68 frictionally contacts a large portion of cylindrical border 48 of rotating drum 46, causing the drum and corresponding rear wheel 30a to stop rotating. When the user releases brake lever 52, the biasing of torsion spring 60 pushes cable 54a towards brake band 66, and causes brake band 66 and braking material strip 68 to open away from cylindrical border 48 of drum 46, allowing rear wheel 30a to be rotated once again. The structure and functionality of wheel brake assembly 50 apply braking force to both rear wheels 30a, 30b simultaneously via a single action of the user squeezing brake lever 52.

Parking Brake Assembly

Figure 6:
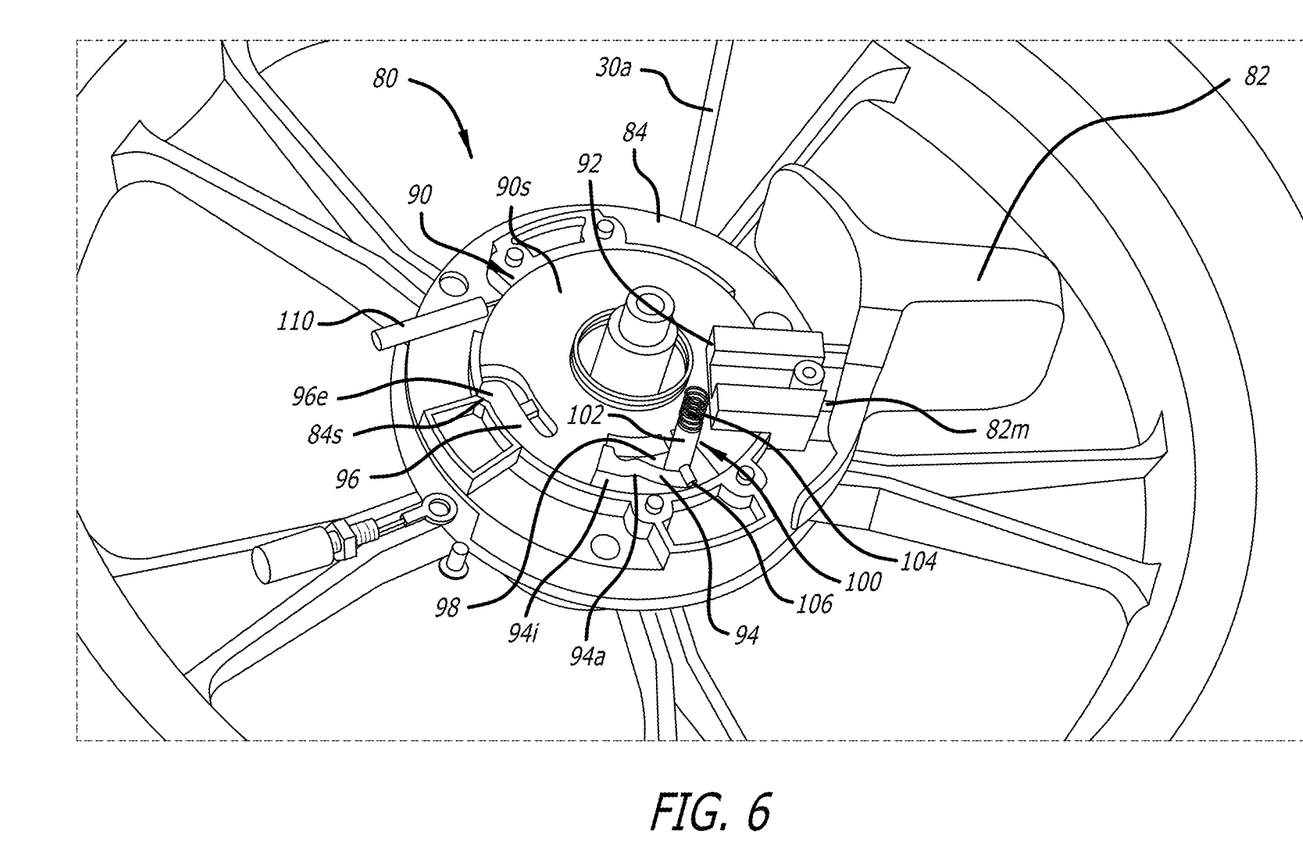
FIG. 6 is sectioned perspective view illustrating one embodiment for the application of the parking brake assembly of the present disclosure.
Figure 7:
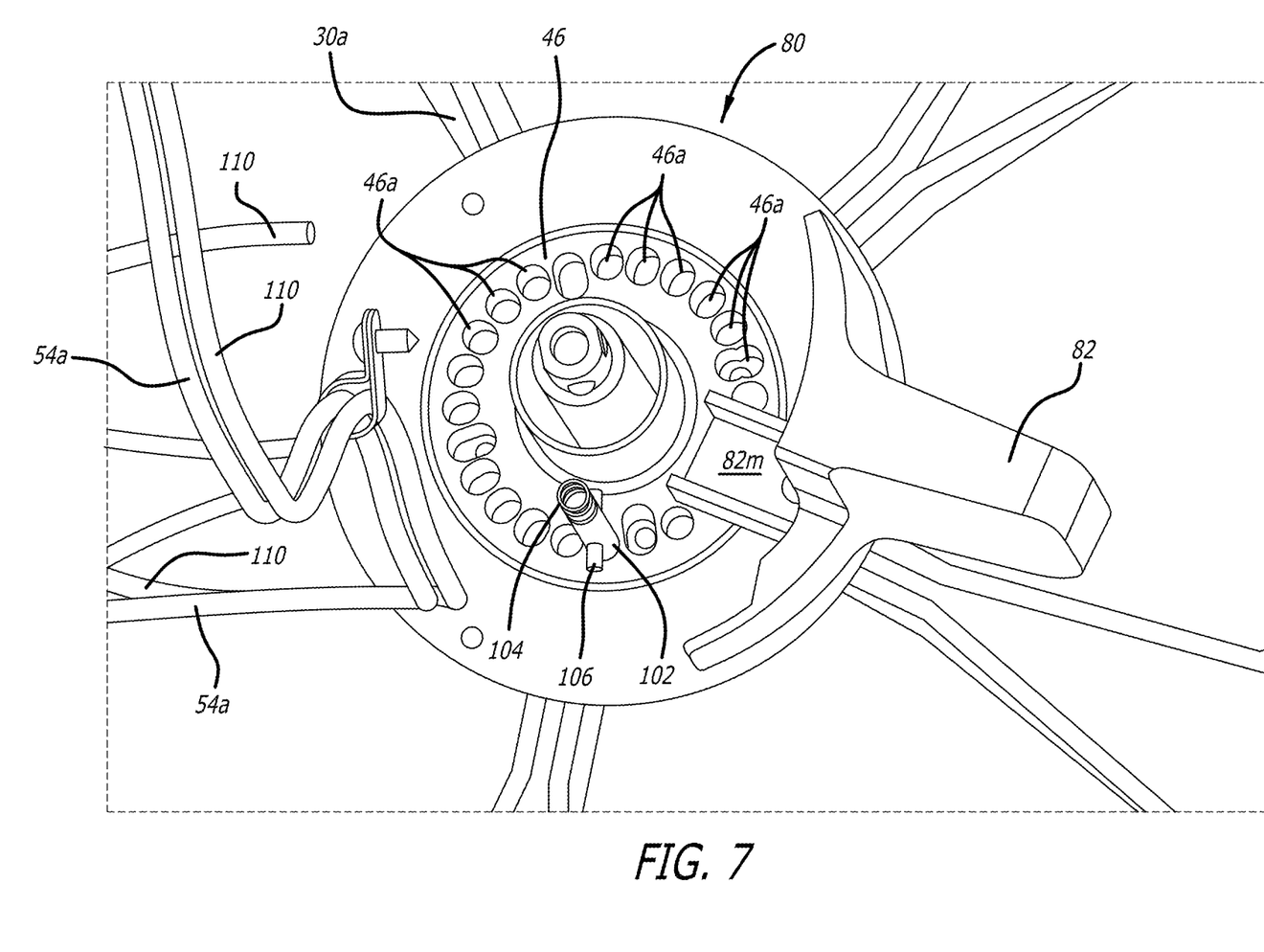
FIG. 7 is another sectioned perspective view illustrating one embodiment for the application of the parking brake assembly of the present disclosure.
Figure 8:
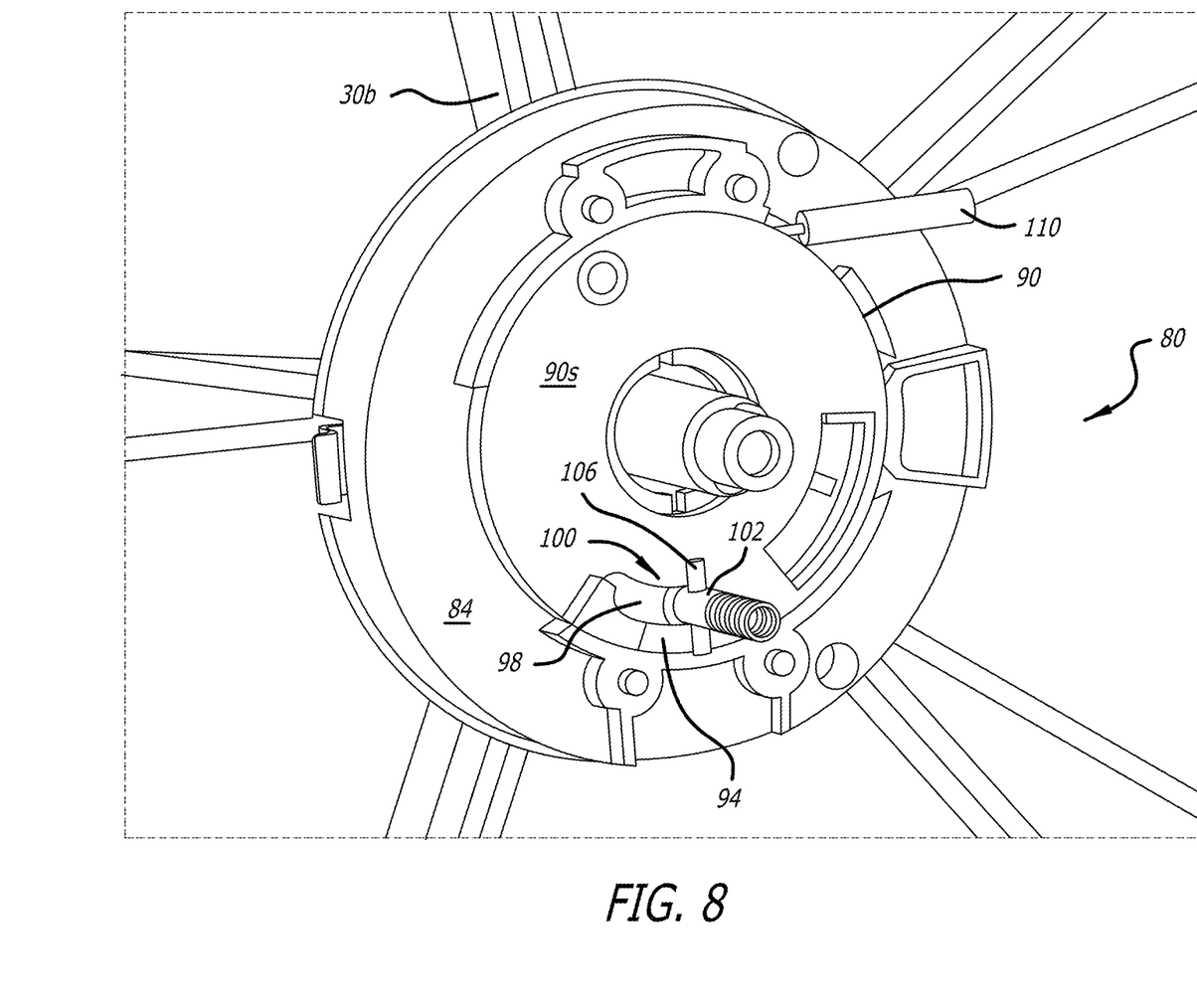
FIG. 8 is a further sectioned perspective view illustrating one embodiment for the application of the parking brake assembly of the present disclosure.

FIGS. 6 to 8 illustrate that child stroller 10 may provide a parking brake assembly 80 in addition to or alternatively to wheel brake assembly 50. For reference, FIG. 2 illustrates that parking brake assembly 80 includes a parking brake pedal 82 provided at rear wheel mount 40a for rear wheel 30a in one embodiment. In the illustrated embodiment, parking brake pedal 82 is configured such that the user's foot rotates the pedal downwardly to apply the parking brake assembly 80. Parking brake pedal 82 is configured such that the user's toe rotates parking brake pedal 82 upwardly to unlock parking brake assembly 80. Like with wheel brake assembly 50, a single user actuation of parking brake pedal 82 advantageously applies the parking brake to or removes the parking brake from both rear wheels 30a, 30b simultaneously, as illustrated in more detail below.

FIG. 6 removes a cover from rear wheel mount 40a so that parking brake assembly 80 is visible. In FIG. 6, parking brake pedal 82 includes a member 82m (better illustrated in FIG. 7) that extends into a mating receptacle 92 of a parking brake disc 90. Parking brake disc 90 is located within a parking brake collar 84 and is rotated about a central axis of rear wheel 30a via the user actuation of parking brake pedal 82.

FIG. 6 illustrates that parking brake disc 90 is formed with or attached to a ramp 94, which is sized so that the ramp is located adjacent to (e.g., outside of) slot or aperture 98. Ramp 94 ramps up from a base surface 90s of parking brake disc 90 to an apex 94a. Ramp 94 adjacent to apex 94a also includes an indented holding portion 94i, which, as discussed in more detail herein, holds parking brake assembly 80 in an unlocked position until parking brake pedal 82 is actuated. FIG. 6 also illustrates that parking brake disc 90 may be formed with or attached to a clip 96, such as a spring clip. FIG. 6 shows parking brake assembly 80 in a parking brake applied or locked configuration, wherein parking brake pedal 82 has been rotated fully downwardly. Here, an engagement edge 96e of spring clip 96 has snap-fitted over a stop 84s of parking brake collar 84. The snap-fitting of engagement edge 96e of clip 96 over stop 84s of parking brake collar 84 helps to maintain parking brake pedal 82 in the fully rotated down (locked) position. The user overcomes the spring force of spring clip 96 to unlock parking brake assembly 80.

FIG. 6 further illustrates that parking brake assembly 80 includes a spring-loaded actuator 100. Spring-loaded actuator 100 incudes a body 102 mounted within rear wheel mount 40a to extend generally perpendicular to parking brake disc 90. A compression spring 104 is located between actuator body 102 and a wall of rear wheel mount 40a (removed in FIG. 6). Compression spring 104 biases actuator body 102 towards a slot or aperture 98 formed in parking brake disc 90. Spring-loaded actuator 100 in the embodiment of FIG. 6 also includes a pin 106 that extends generally perpendicular to actuator body 102. Pin 106 may be formed with actuator body 102 or be attached through a hole formed in actuator body 102. Accordingly, compression spring 104 is also biased to push pin 106 against ramp 94 and over apex 94a into indented holding portion 94i depending on the rotational position of parking brake disc 90.

In FIG. 6, parking brake pedal 82 is illustrated in the fully rotated down or locked position, wherein rear wheels 30a, 30b are not free to rotate. Parking brake disc 90 is also in the clockwise-most rotational position relative to parking brake collar 84, wherein engagement edge 96e of clip 96 of disc 90 has snap-fitted over stop 84s of parking brake collar 84. Additionally, pin 106 is located at the lowest or entrance part of ramp 94 (located adjacent to slot or aperture 98), which allows compression spring 104 to decompress or expand so that actuator body 102 of spring-loaded actuator 100 is able to extend through slot or aperture 98 formed in parking brake disc 90. When the user rotates parking brake pedal 82 upwardly, pin 106 is forced to translate up along ramp 94, forcing actuator body 102 out of slot or aperture 98, and compressing compression spring 104. When parking brake pedal 82 reaches its fully rotated upward position, pin 106 is translated in FIG. 6 up over apex 94a and into indented holding portion 94i. Here, parking brake assembly 80 is in an unlocked condition, wherein rear wheels 30a, 30b are free to rotate. When in the unlocked position, apex 94a tends to hold pin 106 and thus spring-loaded actuator 100 so as not to accidentally actuate the parking brake.

In FIG. 7, parking brake disc 90 has been removed so that rotating drum 46 of or associated with rear wheel 30a may be viewed. As discussed above for wheel brake assembly 50, rotating drum 46 rotates with its respective wheel 30a, 30b. In the illustrated embodiment, rotating drum 46 on its parking brake surface includes or defines a series of holes or apertures 46a. Holes or apertures 46a are formed very close together such that the walls separating holes or apertures 46a may be rounded or pointed, so that the contacting tip of actuator body 102 is readily guided into the next hole or aperture 46a that rotates into registry with actuator body 102 while under compression from spring 104. When the user rotates parking brake pedal 82 downwardly to apply parking brake assembly 80, compression spring 104 is able to push actuator body 102 into the next available hole or aperture 46a. Afterwards, wheel 30a is no longer free to rotate. Wheel 30a remains in the locked state until the user rotates parking brake pedal 82 upwardly to unlock parking brake assembly 80, wherein pin 106 and actuator body 102 are forced up ramp 94, removing actuator body 102 from the engaged hole or aperture 46a.

FIG. 2 illustrates that a cable 110 of parking brake assembly 80 extends from rear wheel mount 40a of rear wheel 30a to rear wheel mount 40b of rear wheel 30b. Cable 110, like cables 54a, 54b is located within a flexible plastic sheath or tube for protection and guidance. FIG. 7 shows a section of cable 110 extending towards rotating drum 46. FIG. 6 importantly illustrates that cable 110 is attached to parking brake disc 90. Cable 110 is accordingly moved (translated) as parking brake disc 90 is rotated. In the illustrated embodiment, as parking brake pedal 82 is rotated downwardly (clockwise) to lock parking brake assembly 80, cable 110 is pulled from left-to-right in FIG. 6 and is pulled away from a parking brake disc 90 associated with opposing rear wheel mount 40b of rear wheel 30b. As parking brake pedal 82 is rotated upwardly (counterclockwise) to unlock parking brake assembly 80, cable 110 is pushed from right-to-left in FIG. 6 and is pushed towards parking brake disc 90 associated with opposing rear wheel mount 40b of rear wheel 30b.

FIG. 8 illustrates parking brake disc 90 associated with opposing rear wheel mount 40b of rear wheel 30b. Parking brake disc 90 for rear wheel 30b includes certain of the same components of parking brake disc 90 for rear wheel 30a, including a ramp 94 extending up from base surface 90s and a slot or aperture 98 formed in base surface 90s. Parking brake assembly 80 at rear wheel mount 40b of rear wheel 30b also provides a spring-loaded actuator 100 having a body 102 mounted within rear wheel mount 40b to extend generally perpendicular to parking brake disc 90. A compression spring 104 is located between actuator body 102 and a wall of rear wheel mount 40a (removed in FIG. 8). Compression spring 104 is biased to push actuator body 102 towards slot or aperture 98 formed in parking brake disc 90. Spring-loaded actuator 100 also includes a pin 106 that extends generally perpendicular to actuator body 102. Accordingly, compression spring 104 is also biased to push pin 106 against ramp 94 depending on the rotational position of parking brake disc 90.

The downward rotation of parking brake pedal 82 in FIG. 6 (to lock wheel 30a) pulls cable 110 away from parking brake disc 90 for rear wheel 30b in FIG. 8. The pulling force causes a clockwise rotation of parking brake disc 90, such that pin 106 slides down ramp 94, allowing compression spring 104 to push body 102 of actuator 100 through slot or aperture 98 and into a hole or aperture 46a of the rotating drum 46 of or associated with wheel 30b. Thus a single action of parking brake pedal 82 by the user applies parking brake assembly 80 to both rear wheels 30a, 30b.

The upward rotation of parking brake pedal 82 in FIG. 6 (to unlock wheel 30a) pushes cable 110 towards parking brake disc 90 for rear wheel 30b in FIG. 8. The pushing force causes a counterclockwise rotation of parking brake disc 90, such that pin 106 slides up ramp 94, compressing compression spring 104 and pulling body 102 of actuator 100 from slot or aperture 98 and from the hole or aperture 46a of the rotating drum 46 of or associated with wheel 30b. Likewise, a single action of parking brake pedal 82 by the user unlocks parking brake assembly 80 from both rear wheels 30a, 30b.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. For example, while the child stroller described herein is generally illustrated as a jogging stroller having two rear wheels and a single front wheel, the wheel brake assembly and the parking brake assembly described herein may be employed on any type of child stroller, including strollers having two front and two rear wheels. Also, while parking brake assembly 80 shows parking brake pedal 82 as being a separate piece from parking brake disc 90, parking brake pedal 82 and parking brake disc 90 may be formed alternatively as a single piece. Further, it will be evident to one skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention is claimed as follows:

1. A parking brake assembly comprising:
   a parking brake disc defining an aperture and a ramp located adjacent to the aperture;
   a pedal configured such that when the user actuates the pedal, the parking brake disc is rotated in a locking direction or an unlocking direction; and
   an actuator including a body and a spring biased to push the body towards the aperture, the actuator further including a pin positioned and arranged to ride along the ramp when the parking brake disc is rotated relative to the actuator, wherein the spring is allowed to push the body through the aperture and into a mating hole, of or associated with a wheel, when the parking brake disc is rotated in the locking direction such that the pin rides down the ramp, and wherein the spring is prevented from pushing the body through the aperture and into the mating hole when the parking brake disc is rotated in the unlocking direction such that the pin rides up the ramp,
   wherein the parking brake disc includes a spring clip configured to snap-fit over a stop of an adjacent parking brake collar when the parking brake disc is rotated fully in the locking direction.

2. The parking brake assembly of claim 1, wherein the pedal is separate from and connected to the parking brake disc.

3. The parking brake assembly of claim 1, wherein the aperture defined by the parking brake disc is a slotted aperture.

4. The parking brake assembly of claim 1, wherein the body of the actuator is at least substantially perpendicular to the aperture of the parking brake disc.

5. The parking brake assembly of claim 1, wherein the ramp includes a radius sized so that the ramp is located adjacent to the aperture.

6. The parking brake assembly of claim 1, wherein the ramp extends to an apex, and wherein an indented holding portion is provided adjacent to the apex for releasably holding the pin and the body of the actuator when the parking brake disc is rotated fully in the unlocking direction.

7. The parking brake assembly of claim 1, wherein the parking brake disc is held rotatably within a parking brake collar.

8. The parking brake assembly of claim 1, wherein the parking brake disc is a first parking brake disc provided for the wheel, which includes a second parking brake disc provided for a second wheel, which includes a cable extending between the first and second parking brake discs, such that (i) rotating the first parking brake disc in the locking direction causes the cable to rotate the second parking brake disc in a locking direction, and (ii) rotating the first parking brake disc in the unlocking direction causes the cable to rotate the second parking brake disc in an unlocking direction.

9. The parking brake assembly of claim 1, wherein a second parking brake disc defines a second aperture and a second ramp located adjacent to the second aperture, which includes a second actuator including a second body and a second spring biased to push the second body towards the second aperture, the second actuator further including a second pin positioned and arranged to ride along the second ramp when the second parking brake disc is rotated relative to the second actuator, wherein the second spring is allowed to push the second body through the second aperture and into a second mating hole, of or associated with the second wheel, when the second parking brake disc is rotated in the locking direction such that the second pin rides down the second ramp, and wherein the second spring is prevented from pushing the second body through the second aperture and into the second mating hole when the second parking brake disc is rotated in the unlocking direction such that the second pin rides up the second ramp.

10. A child stroller comprising:
a wheel including or associated with a drum that rotates with the wheel; and
a parking brake assembly including
a parking brake disc defining an aperture and a ramp located adjacent to the aperture;
a pedal configured such that when the user actuates the pedal, the parking brake disc is rotated in a locking direction or an unlocking direction; and
an actuator including a body and a spring biased to push the body towards the aperture, the actuator further including a pin positioned and arranged to ride along the ramp when the parking brake disc is rotated relative to the actuator, wherein the spring is allowed to push the body through the aperture and into a mating hole formed in the drum when the parking brake disc is rotated in the locking direction such that the pin rides down the ramp, and wherein the spring is prevented from pushing the body through the aperture and into the mating hole formed in the drum when the parking brake disc is rotated in the unlocking direction such that the pin rides up the ramp,
wherein the drum forms a plurality of holes in a circular pattern.

11. The child stroller of claim 10, wherein the plurality of holes are separated by thin walls of the drum.

12. The child stroller of claim 10, wherein the wheel is a rear wheel of the child stroller.

13. The child stroller of claim 10, which is a jogging stroller.

14. The child stroller of claim 10, wherein the stroller further comprises a wheel brake assembly comprising:
a brake lever positioned and arranged to be grasped and actuated by a user;
a lever actuated cable extending from the brake lever;
a connector, the lever actuated cable extending to the connector;
first and second rear wheel cables extending from the connector;
a bracket, the first rear wheel cable extending to the bracket;
a brake band in mechanical communication with the bracket; and
a spring biasing the bracket such that the brake lever is maintained in an unactuated position and such that a wheel is free to rotate within the brake band.

15. The wheel brake assembly of claim 14, wherein the first and second rear wheel cables extending from a first side of the connector, the first side opposing a second side of the connector to which the lever actuated cable extends.

16. The wheel brake assembly of claim 14, wherein the bracket includes a first leg and a second leg, wherein the first rear wheel cable extends to the first leg of the bracket, and wherein the brake band is in mechanical communication with the second leg of the bracket.

17. The wheel brake assembly of claim 16, wherein the bracket is pivotally connected to a fixture at an intersection of the first and second legs of the bracket.

18. The wheel brake assembly of claim 16, wherein the spring biases the first leg of the bracket.

* * * * *